(12) United States Patent
Seddon

(10) Patent No.: US 6,583,410 B1
(45) Date of Patent: Jun. 24, 2003

(54) POLARIMETER

(76) Inventor: Elaine Ann Seddon, Bracken Cottage, Alvanley Road, Helsby, Cheshire, WA6 9PU (GB)

( * ) Notice: Subject to any disclaimer, the term of this patent is extended or adjusted under 35 U.S.C. 154(b) by 0 days.

(21) Appl. No.: 09/743,401

(22) PCT Filed: Jul. 8, 1999

(86) PCT No.: PCT/GB99/02184
§ 371 (c)(1),
(2), (4) Date: Mar. 26, 2001

(87) PCT Pub. No.: WO00/03267
PCT Pub. Date: Jan. 20, 2000

(30) Foreign Application Priority Data

Jul. 9, 1998 (GB) .............................................. 9814775

(51) Int. Cl.⁷ .......................... H01J 40/00; H01J 47/00; G01N 23/00; G21K 7/00
(52) U.S. Cl. ........................ 250/305; 250/310; 250/307
(58) Field of Search ................................ 250/305, 307, 250/310

(56) References Cited

U.S. PATENT DOCUMENTS

| 4,760,254 A | | 7/1988 | Pierce et al. ................. 250/305 |
| 5,166,522 A | * | 11/1992 | Koike et al. ................. 250/310 |
| 5,315,127 A | * | 5/1994 | Nakanishi .................... 257/11 |

FOREIGN PATENT DOCUMENTS

| WO | WO 00/03267 | 1/2000 |

OTHER PUBLICATIONS

Gray et al., "Simple, compact, medium–energy Mott polarization analyzer," Rev. Sci. Instrum. 55 (1), Jan. 1984, p. 88–91, © 1984 American Institute of Physics.

Kisker, "Measurement of the three components of the electron–spin polarization vector," Rev. Sci. Instrum., vol. 53, No. 4, Apr. 1982, p. 507–508, © 1982 American Institute of Physics.

van der Sluijs et al., "Spin–dependent electron transmission through ultra–thin magnetic layers: towards highly discriminative, compact spin detectors," C. R. Acad. Sci. Paris, t. 319, Série II, p. 753–759, © 1994 Académie des Sciences.

Drouhin et al., "Spin–dependent transmission of free electrons through ultrathin cobalt layers (invited)," J. Appl. Phys. 79 (8), p. 4734–4739, Apr. 15, 1996, © 1996 American Institute of Physics.

Drouhin et al., "Electron transmission through ultra–thin metal layers and its spin dependence for magnetic structure," Journal of Magnetism and Magnetic Materials 151 (1995), p. 417–426, © 1995 Elsevier Science B.V.

Tang et al., "Compact low–energy Mott polarimeter for use in energy– and angle–resolved polarization studies," Rev. Sci. Instrum. 59 (3), p. 504–505, Mar. 1988, © 1988 American Institute of Physics.

(List continued on next page.)

*Primary Examiner*—Bruce Anderson
(74) *Attorney, Agent, or Firm*—Richard Schafer; Akin Gump Strauss Hauer & Feld LLP

(57) ABSTRACT

A polarimeter for analysing the electron-spin polarisations of an electron beam, the polarimeter comprising first target means comprising a layer of material for scattering a beam of electrons in directions dependent upon the transverse spin-orientation of the incident electrons, and first detector means for detecting the scattered electrons. The polarimeter also having second target means comprising a layer of ferromagnetic material, magnetising means for magnetising the ferromagnetic layer such that the second target means will transmit a beam of electrons at a rate dependent upon the longitudinal spin-orientation of the electrons, and second detector means for detecting the transmitted electrons.

19 Claims, 2 Drawing Sheets

OTHER PUBLICATIONS

Dunning et al., "Simple and compact low-energy Mott polarization analyzer," Rev. Sci. Instrum. 58 (9), Sep. 1987, p. 1706–1708, © 1994 American Institute of Physics.

Burnett et al., "High-efficiency retarding-potential Mott polarization analyzer," Rev. Sci. Instrum. 65 (6), Jun. 1994, p. 1893–1896, © 1994 American Institute of Physics.

Lassailly et al., "Spin-dependent transmission of low-energy electrons through ultrathin magnetic layers," Phys. Rev. B., vol. 50, No. 17, Nov. 1994, p. 13054–13057, © 1994 The American Physical Society.

* cited by examiner

POLARIMETER

CROSS-REFERENCE TO RELATED APPLICATIONS

This application claims priority to: PCT Application No. PCT/GB99/02184 filed on Jul. 8, 1999; and Great Britain Application No. 9814775.4 filed on Jul. 9, 1998.

BACKGROUND OF THE INVENTION

The present invention relates to an electron spin polarimeter.

The spin polarisation of an electron beam is a vector quantity which has two transverse components and one longitudinal component. Measurement of spin polarisation is commonly used in the study of electron scattering processes, in the study of interactions involving polarised atoms and in magnetic studies.

It is of interest to measure each of the three components of spin polarisation of an electron beam. However, known polarimeters are either sensitive to one, or both, of the transverse components, or to the longitudinal component, of the spin polarisation.

A known polarimeter utilises Mott Scattering to measure transverse components of beam polarisation. This polarimeter is commonly referred to as a Mott polarimeter. The Mott polarimeter takes advantage of a left-right scattering asymmetry which results from spin-orbit coupling when high-energy electrons are scattered at large angles from a gold foil. This type of polarimeter is capable of measuring both of the transverse components of spin polarisation of an electron beam, but is unable to measure the longitudinal component.

There are two known methods for measuring each of the three components of spin polarisation of an electron beam. In a first known method two polarimeters are used. The first of the polarimeters measures the transverse spin polarisation components of the electron beam in the normal way. The second polarimeter is displaced perpendicularly from the electron beam, and the beam is deflected through 90° using electrostatic deflection apparatus known as a switchyard, so as to be incident upon the second polarimeter. The deflection of the beam through 90° converts the longitudinal component of spin polarisation into a transverse component which is then measured by the second polarimeter. A disadvantage of this approach is that it requires the use of two polarimeters.

The second approach to measuring all three components of spin polarisation uses a single polarimeter and a spin rotator. In a first measurement the spin rotator is deactivated and the two transverse components of spin polarisation are determined. In a second measurement the spin rotator converts the longitudinal component into a transverse component and then this, together with the undisturbed transverse component, is measured. A disadvantage of this approach is that it requires the use of a spin rotator.

It is an object of the present invention to obviate or mitigate the above disadvantages.

SUMMARY OF THE INVENTION

According to a first aspect of the present invention there is provided a polarimeter for analysing the electron-spin polarisations of an electron beam, the polarimeter comprising first target means comprising a layer of material for scattering a beam of electrons in directions dependent upon the transverse spin-orientation of the incident electrons, first detector means for detecting the scattered electrons, second target means comprising a layer of ferromagnetic material, magnetising means for magnetising the ferromagnetic layer such that the second target means will transmit a beam of electrons at a rate dependent upon the longitudinal spin-orientation of the electrons, and second detector means for detecting the transmitted electrons.

The inventor has realised that a first polarimeter, which measures transverse components of spin polarisation of an electron beam may be combined in one apparatus with a second type of polarimeter which measures the longitudinal spin polarisation of a low energy electron beam. This second type of polarimeter comprises one or more thin magnetic layers sandwiched between non-magnetic layers, the transmission of a low energy electron beam by this combination of layers being dependent upon the longitudinal polarisation of the beam (see for example Lassailly Y., et al, Phys. Rev. B, 1994, Vol. 50, pg. 13054). For instance, the second type of polarimeter may comprise a single thin magnetic layer sandwiched between two non-magnetic layers, or more than two magnetic layers separated by non-magnetic spacers.

When measuring transverse spin polarisation, the electron beam may for example have an energy between 50 eV and 30 keV, and a suitable polarimeter would be, for example a Mott polarimeter such as a compact retarding field polarimeter, an absorbed current polarimeter, a LEED polarimeter, or alternatively a NIST type polarimeter (diffuse scattering polarimeter). In the case of a NIST polarimeter, repeated deposition of fresh gold onto the target is required. The energy of the electron beam during longitudinal polarisation measurement will generally be less than 200 eV. It is envisaged that in the preferred embodiment the energy of the electron beam detected by the first type of polarimeter will be relatively high compared to the second type.

The polarimeter is advantageous in that it allows measurement of each of the three components of spin polarisation of an electron beam using a single piece of apparatus, and without requiring a spin rotator.

Preferably, the layer of ferromagnetic material is sandwiched between front and back layers of an unreactive and non-magnetic material.

Preferably, the first target means comprises the front layer of the second target means. This configuration is advantageous because it allows the first target means to fulfil two roles, i.e. it can function as the first target means when transverse spin polarisation is to be measured, and it can also function as the front layer of the second target means when longitudinal spin polarisation is to be measured.

In the alternative, the first target means and the second target means may be separated from one another. For instance, the second target means might be located downstream (in relation to the electron beam direction) from the first target means. When a (low energy) measurement of longitudinal polarisation is to be performed either the first target means could be moved from the beam path or the electrons could be allowed to pass directly through the first target means so as to be incident at the second target means. Although the apparatus comprises two separate target means in this embodiment, the apparatus is still advantageous in relation to the prior art because it allows the construction of a single polarimeter which measures all components of spin polarisation.

The electron beam incident on the first target means will be both transmitted and scattered to some degree dependent upon the voltage applied to the target. At high voltage spin dependent scattering is more significant than at low voltage. Means are preferably provided for switching a voltage applied to the first target means between such relatively high and relatively low voltages. Preferably, means are provided for switching a voltage applied to the first target means between a high voltage at which electrons are predominantly scattered by the target and a low voltage at which electrons are predominantly transmitted by the first target means towards the ferromagnetic layer.

As mentioned above suitable energy ranges may be between 50 V and 30 kV for the transverse polarisation measurement, and less than 200 V for the longitudinal polarisation measurement. Preferably the energy for the transverse measurement is selected to be suitable for a Mott polarimeter and may typically be 10–20 kV. A typical energy level for the longitudinal polarisation measurement would be below 10 V.

Preferably, the scattered electrons are decelerated by a retarding electrical field before reaching the first detector means. The retarding electric field may be established between electrodes having for instance hemispherical, conical or cylindrical shapes.

Various materials may be used for the first and second target means. Examples of suitable materials for the first target means are gold, thorium and uranium, of which gold is particularly suited because it is unreactive and readily deposited by conventional evaporation techniques.

Any ferromagnetic pure metal or alloy that exhibits remanent magnetisation out of plane may be suitable for use as the ferromagnetic layer. One particular material which is suitable for use as the ferromagnetic layer is cobalt (since it is readily deposited on gold), but any other material exhibiting the appropriate anisotropy may be used (such as iron and nickel for instance). For instance, in one preferred embodiment the target means comprises a layer of cobalt sandwiched between layers of gold. Other hypothetically suitable target structures include a layer of iron sandwiched between layers of thorium or uranium (this has not yet been tested). The magnetic layer must be sufficiently thin that it does not magnetise in its plane. A suitable thickness would for instance be 10 Å of cobalt.

Preferably, the second detector means comprises a retarding field energy analyser, for instance incorporating a channel electron multiplier or micro-channel plate detector.

The magnetising means is preferably an electromagnet.

According to a second aspect of the present invention there is provided a method of determining the longitudinal and transverse components of spin-polarisation of an electron beam, the method comprising directing the beam of electrons accelerated to relatively high energy at a first target means comprising a layer of material for scattering a beam of electrons in directions dependent upon the transverse spin polarisations of the incident electrons, detecting electrons which are scattered from the first target means, and directing the beam of electrons decelerated to relatively low energy at a second target means comprising a layer of ferromagnetic material magnetised such that the second target means will transmit a beam of electrons at a rate dependent upon the longitudinal spin-orientation of the electrons, and detecting electrons transmitted by the second target means.

BRIEF DESCRIPTION OF THE DRAWINGS

A specific embodiment of the invention will now be described by way of example, with reference to the accompanying drawings, in which.

DETAILED DESCRIPTION

Figure 1:
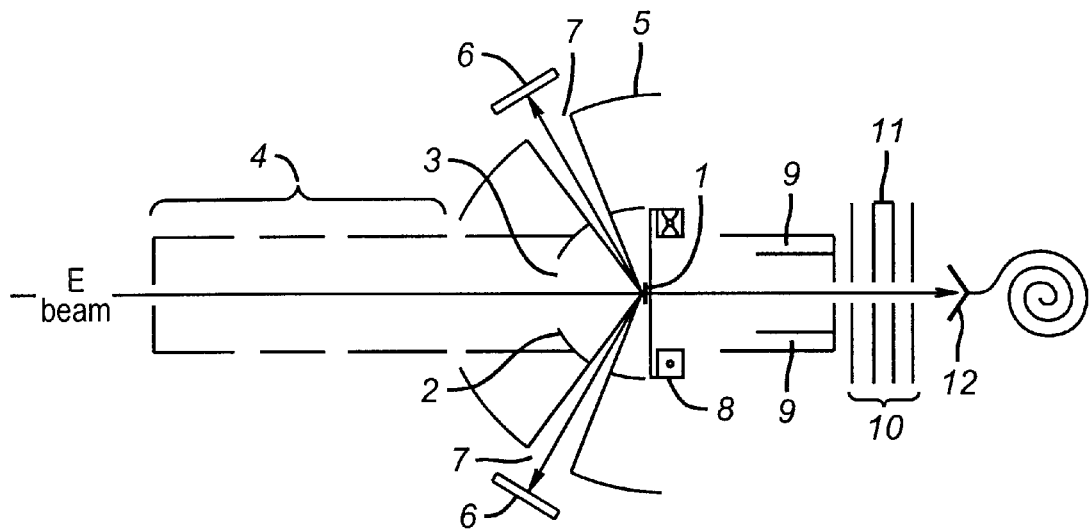
FIG. 1 is a schematic diagram of a polarimeter according to the present invention.

Referring first to FIG. 1, the illustrated polarimeter comprises a target foil 1 held in position by an inner hemispherical electrode 2. The inner hemisphere 2 is provided with an opening 3 to allow an electron beam to impact upon the target foil 1. Input electron optics 4 are provided to focus the electron beam onto the target foil 1. The input optics 4 typically comprises a three element electrostatic lens and/or deflector plates.

An outer hemispherical electrode 5 holds four electron detectors 6, for example, single channel electron multipliers (also known as channeltrons), micro-channel plate detectors or photomultipliers. The two electron detectors not shown in FIG. 1 are in corresponding angular orientation relative to the target foil 1, but are displaced by 90 degrees to either side of the plane of FIG. 1. The detectors 6 are held outside of the outer hemisphere 5. High energy electrons are scattered by the target foil 1 and are decelerated by a retarding electric field established between the inner and outer hemispherical electrodes 2, 5. Those electrons which have not lost a significant amount of energy during scattering from the target foil 1 have sufficient energy to reach the outer hemisphere 5. Those electrons which are scattered through 120 degrees will pass through openings 7 defined in the hemisphere 5 and will be incident on detectors 6. The relative voltage between the hemisphere 5 and the detectors 6 can be adjusted to select the energy of scattered electrons which is detected. Further electron optics may be included at the openings 7 to increase measurement efficiency. Such optics might be conventional, for example as included in Burnett G. C., et al, Rev. Sci. Instrum. 1994, Vol 65(6), pg. 1893. The relative proportions of scattered electrons incident at each detector will depend upon the polarisation of the electron beam incident on the target foil 1.

The above described aspects of the illustrated polarimeter correspond generally to a known design of polarimeter, as described for example by Dunning F. B., et al, Rev. Sci. Instrum. 1987, Vol. 58(9), pg. 1706. However, a fundamental difference between the polarimeter of FIG. 1 and the polarimeter described by Dunning F. B. et al is the structure of the target foil 1, which in the present polarimeter includes a ferromagnetic layer. The foil 1 structure will be discussed below in relation to FIG. 2.

A magnetising coil 8 is positioned behind the target foil 1. It is not essential to the physics of the polarimeter that the coil 8 be located behind the target foil 1, but this is a preferred practical arrangement. The coil 8 may for example be a coaxial coil, and is used to magnetise a central layer of the target foil (shown in FIG. 2) in an orientation perpendicular to the surface of the foil 1, either in the direction of the electron beam or in a direction opposite to that of the electron beam (i.e. parallel or anti-parallel to the electron beam direction). When low energy electrons are incident at the foil 1, their transmission through the target foil 1 is dependent upon the longitudinal component of their polarisation. Changing the direction of magnetisation of the central layer alters the transmission of the foil 1, thereby allowing determination of the longitudinal component of polarisation. Caesium dispensers 9 are positioned behind the target foil 1 to coat the rear surface of the target foil 1 with an extremely thin layer of Caesium, thereby reducing the work function of foil 1 in accordance with well established practice (see for example Lassailly Y., et al, Phys. Rev. B, 1994, Vol. 50, pg. 13054).

Transfer optics 10 incorporating a retarding field analyser 11 are used to energy select electrons transmitted by the target foil 1 and focus them at an exit electron detector 12 (examples of which are mentioned above). The exit electron detector 12 determines the transmitted electron current, and may be movable to allow the electron beam to be used in a further experiment.

Figure 2:
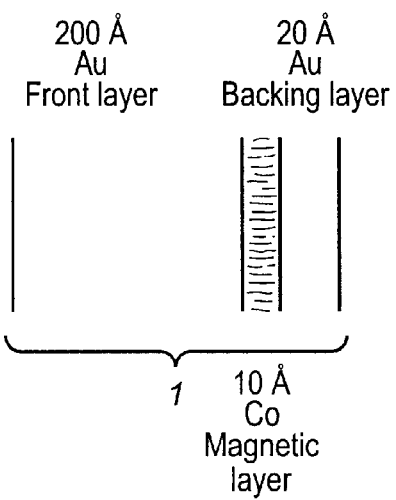
FIG. 2 is a schematic diagram of a target foil of the polarimeter shown in FIG. 1.

The structure of the target foil 1 is shown in FIG. 2. The target foil 1 comprises a thin (for instance approx. 10 Angstroms) magnetic layer of cobalt sandwiched between a front layer of gold (for instance approx. 200 Angstroms) and a thinner back layer of gold (for instance approx. 20 Angstroms); where front refers to the layer facing the incident beam. The thicknesses of the cobalt and gold layers are variable within certain constraints. For example, the backing layer should be as thin as possible but thick enough to prevent oxidation of the middle magnetic layer. The central magnetic layer must be sufficiently thin that it can be remanently magnetised out of plane. The front gold layer needs to be as thin as possible but must be thick enough to enable efficient high energy scattering and to result in a self supporting film. Other combinations of materials could in principle be used.

In operation, two measurements are made in order to make a complete determination of the spin polarisation P of the electron beam. In a first measurement the two transverse components are determined. The incoming electron beam is focused at, and perpendicularly incident upon, the target foil 1 which is held at high voltage (typically 10–20 kV) in the inner hemisphere 2. Electrons scattered in a backward direction from the thick gold front layer of the foil 1 pass through the openings 7, are focused and "filtered", and then detected by detectors 6. Asymmetry observed in the count rate of opposite pairs of detectors 6 is related to the beam transverse polarisation by:

$$P_V = \frac{A_H}{S_{eff}}$$
$$P_H = \frac{A_V}{S_{eff}}$$

where $A_H$ is the count rate asymmetry observed in the horizontal plane detectors and $A_V$ is the count rate asymmetry observed in the vertical plane detectors, and $P_V$ and $P_H$ are the vertical and horizontal incident electron beam polarisations. Whilst this measurement is taking place the transfer optics 10 and exit detector 12 play no part and are held at around ground potential.

In the second measurement the incoming electron beam is again focused at the target foil 1, but in this instance the foil 1 is held at low voltage, typically less than 20 V. Electrons are transmitted through the target foil 1 and then focused at the exit detector 12 after being energy filtered by the retarding field analyser 11. Two measurements are needed, the first with the magnetic layer of the foil 1 magnetised by the magnetising coil 8 to be parallel to the beam propagation direction, and the second with the magnetic layer magnetised antiparallel to the beam propagation direction.

The longitudinal polarisation of the electron beam P can be defined as follows:

$$S \cdot P = \frac{I_+ - I_-}{I_+ + I_-}$$

where $I_+$ and $I_-$ respectively represent the intensity of electrons transmitted when the ferromagnetic layer is magnetised parallel and anti-parallel to the electron beam direction, and S is the equivalent of the Sherman function which characterises the efficiency of the polarimeter (typically 0.2).

The present invention thus allows all three components of polarisation of a beam of electrons to be measured using a single polarimeter.

Figure 3:
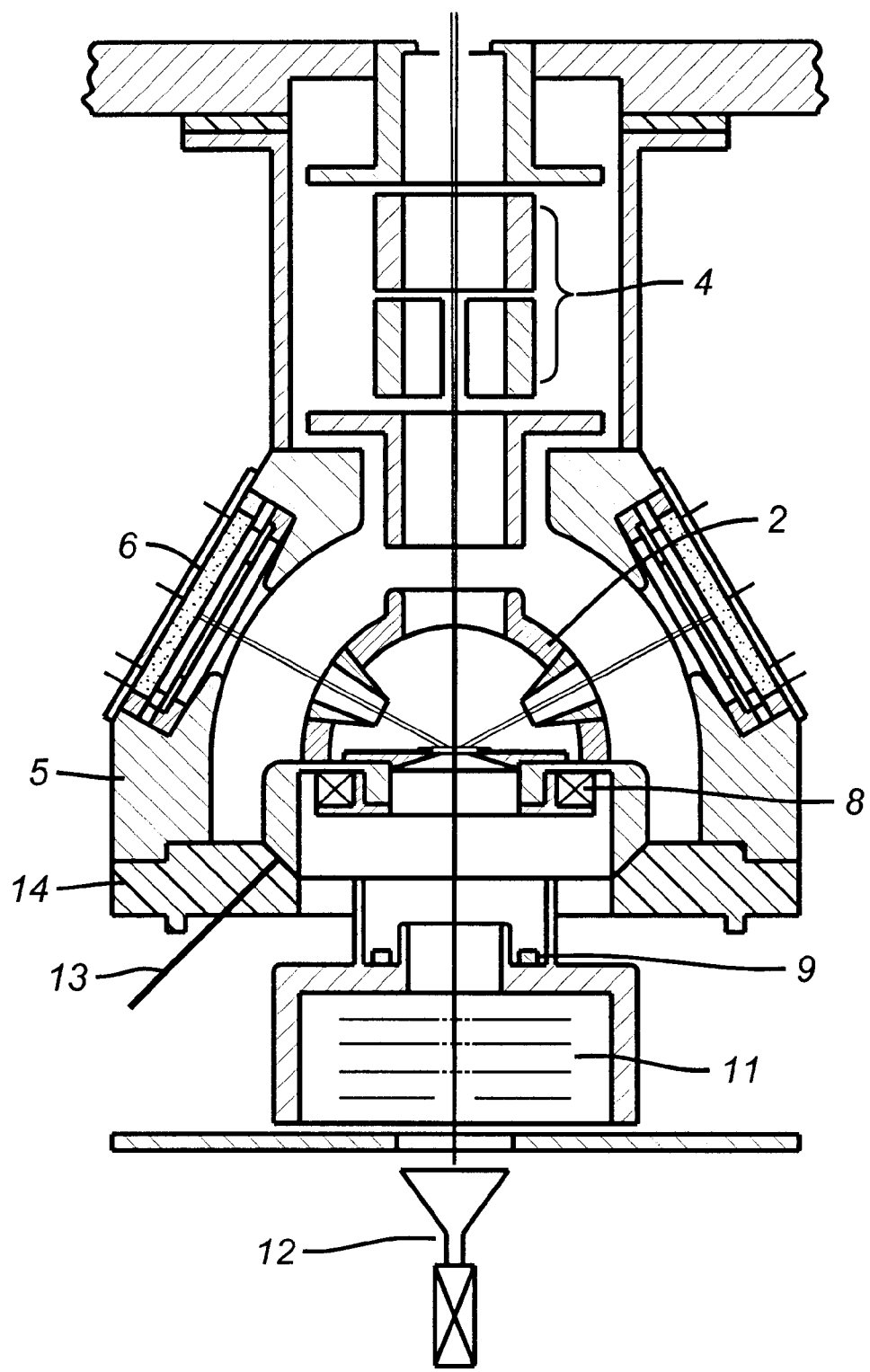
FIG. 3 is a cross-section of a detailed embodiment of the present invention.

FIG. 3 shows a detailed embodiment of the apparatus described above. Like features are given the same reference numerals as used in FIG. 1, and will not be further described. A high voltage connection 13 is connected to the coil 8 to enable it to be magnetised. Insulation 14 is provided at the rear of outer hemisphere 5, which may, for example, be Macor insulation to electrically isolate the polarimeter components.

As one possible modification of the above polarimeter, the target 1 could be replaced by two separate targets: a first target would be moveable and would be for scattering a high energy electron beam, and a second target separated from and situated behind the first target for transmitting low energy electrons. The first target might be movable so as to avoid attenuating the beam before it is incident at the second target (when the second target is being used).

What is claimed is:

1. A polarimeter for analysing the electron-spin polarisations of an electron beam, the polarimeter comprising:
   first target means comprising a layer of material for scattering a beam of electrons in directions dependent upon the transverse spin-orientation of the incident electrons,
   first detector means for detecting the scattered electrons,
   second target means comprising a layer of ferromagnetic material,
   magnetising means for magnetising the ferromagnetic layer such that the second target means will transmit a beam of electrons at a rate dependent upon the longitudinal spin orientation of the electrons, and
   second detector means for detecting the transmitted electrons.

2. A polarimeter according to claim 1, wherein the layer of ferromagnetic material is sandwiched between front and back layers of protective support material.

3. A polarimeter according to claim 2, wherein the first target means comprises the front layer of the second target means.

4. A polarimeter according to claim 2, wherein the ferromagnetic layer is cobalt, nickel or iron and the front and back layers are gold.

5. A polarimeter according to claim 2, wherein the first target means and the second target means are separated from one another.

6. A polarimeter according to claim 5, wherein the second target means is located downstream (in relation to the electron beam direction) from the first target means.

7. A polarimeter according to claim 1, wherein the first target means and the second target means are separated from one another.

8. A polarimeter according to claim 7, wherein the second target means is located downstream (in relation to the electron beam direction) from the first target means.

9. A polarimeter according to claim 1, wherein means are provided for switching a voltage applied to the first target means between a high voltage at which electrons are scattered by the target and a low voltage at which electrons are transmitted by the first target means towards the ferromagnetic layer.

10. A polarimeter according to claim 9, wherein the high voltage is in the range 50 V–30 kV, and the low voltage is less than 200 V.

11. A polarimeter according to claim 9, wherein the high voltage is in the range 10 kV–30 kV, and the low voltage is less than 100 V.

12. A polarimeter according to claim 1, wherein the scattered electrons are decelerated by a retarding electrical field before reaching the first detector means.

13. A polarimeter according to claim 12, wherein the retarding electric field is established between hemispherical electrodes.

14. A polarimeter according to claim 1, wherein the ferromagnetic layer has a thickness in the range of 1–20 Angstroms.

15. A polarimeter according to claim 1, wherein the front layer has a thickness in the range of 1–500 Angstroms.

16. A polarimeter according to claim 1, wherein the back layer has a thickness in the range of 1–100 Angstroms.

17. A polarimeter according to claim 1, wherein the second detector means comprises a channeltron or microchannel plate detector.

18. A polarimeter according to claim 1, wherein the magnetising means is an electromagnet.

19. A method of determining the longitudinal and transverse components of a spin-polarisation of an electron beam, the method comprising:

directing the beam of electrons accelerated to relatively high energy at a first target means comprising a layer of material for scattering a beam of electrons in directions dependent upon the transverse s pin polarisations of the incident electrons, detecting electrons which are scattered from he first target means, directing the beam of electrons decelerated to relatively low energ second target means comprising a layer of ferromagnetic material magnetised such that the second target means will transmit a beam of electrons at a rate dependent upon the longitudinal spin-orientation of the electrons, and detecting electrons transmitted by the second target means.

* * * * *

UNITED STATES PATENT AND TRADEMARK OFFICE
CERTIFICATE OF CORRECTION

PATENT NO. : 6,583,410 B1
DATED : June 24, 2003
INVENTOR(S) : Elaine Ann Seddon

It is certified that error appears in the above-identified patent and that said Letters Patent is hereby corrected as shown below:

<u>Title page,</u>
Item [73],Assignee, should read -- Council for the Central Laboratory of the Research Councils --

Signed and Sealed this

Fourteenth Day of October, 2003

JAMES E. ROGAN
*Director of the United States Patent and Trademark Office*